United States Patent
Yang (10) Patent No.: US 9,898,188 B2
(45) Date of Patent: Feb. 20, 2018

(54) INFORMATION PROCESSING METHOD AND ELECTRONIC DEVICE

(71) Applicant: Lenovo (Beijing) Co., Ltd., Beijing (CN)

(72) Inventor: Chunlong Yang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 335 days.

(21) Appl. No.: 14/633,928

(22) Filed: Feb. 27, 2015

(65) Prior Publication Data

US 2016/0062534 A1 Mar. 3, 2016

(30) Foreign Application Priority Data

Aug. 26, 2014 (CN) .......................... 2014 1 0425066

(51) Int. Cl.
*G06F 3/048* (2013.01)
*G06K 9/00* (2006.01)
*G06F 3/0488* (2013.01)

(52) U.S. Cl.
CPC ..... *G06F 3/04883* (2013.01); *G06K 9/00355* (2013.01); *G06K 9/00429* (2013.01); *G06F 2203/0338* (2013.01)

(58) Field of Classification Search
CPC ........ G06F 3/04883; G06F 2203/0338; G06K 9/00355; G06K 9/00429
See application file for complete search history.

(56) References Cited

U.S. PATENT DOCUMENTS

| 2011/0080430 | A1* | 4/2011 | Nishibe | G06F 3/04883 345/661 |
| 2012/0182322 | A1* | 7/2012 | Yeh | G06F 3/04883 345/660 |
| 2013/0324089 | A1 | 12/2013 | Kim | |
| 2014/0010441 | A1* | 1/2014 | Shamaie | G06K 9/00355 382/164 |
| 2015/0135108 | A1* | 5/2015 | Pope | G06K 9/00006 715/767 |

FOREIGN PATENT DOCUMENTS

CN 103455742 12/2013

OTHER PUBLICATIONS

First Office Action (10 pages including English translation) dated Oct. 21, 2016 out of Chinese Priority Application 201410425066.5.
Second Office Action (12 pages including English translation) dated Jun. 7, 2017 out of Chinese Priority Application 201410425066.5.
Third Office Action (12 pages including English translation) dated Oct. 31, 2017 from Chinese Priority Application 201410425066.5.

* cited by examiner

*Primary Examiner* — Ariel Balaoing
(74) *Attorney, Agent, or Firm* — Brinks Gilson & Lione; G. Peter Nichols (57) ABSTRACT

An information processing method and an electronic device are described. The method is applied to an electronic device and includes obtaining first track data of a motion of an operating body with respect to the electronic apparatus, and obtaining first identification data of the operating body; deriving first input data corresponding to the first identification data and the first track data; and the electronic apparatus responding to the first input data.

16 Claims, 6 Drawing Sheets

INFORMATION PROCESSING METHOD AND ELECTRONIC DEVICE

This application claims priority to Chinese patent application No. 201410425066.5 filed on Aug. 26, 2014, the entire contents of which are incorporated herein by reference.

The present application relates to the field of electronic technique, and more particularly, to an information processing method and an electronic device.

BACKGROUND

At present, increasingly diversified interaction manners are used between a user and an electronic device, which greatly facilitates people's daily production and life. Among them, the user can input in manner of track or gesture, for example, when the user operates on an electronic device with a touch screen, it may be defined that a gesture stroking leftward is a back operation, drawing a circle represents a select operation, drawing a triangle inputs a character "@", and the like. As such, when the user draws a corresponding track on the touch screen, corresponding input information can be input. Performing an input in manner of track or gesture not only is vivid but also can achieve fast and accurate input.

However, since the user can only acquaint with, remember, and master a limited number of gestures or tracks, it results in that when performing an input in manner of track or gesture, only a smaller amount of input information can be input.

SUMMARY

The present application provides an information processing method and an electronic device.

An aspect of the present application provides an information processing method applied to an electronic device, the method comprising: obtaining first track data of a motion of an operating body with respect to the electronic apparatus, and obtaining first identification data of the operating body; deriving first input data corresponding to the first identification data and the first track data; and the electronic apparatus responding to the first input data.

Optionally, obtaining first track data comprises: obtaining first track data of the operating body via a touch control unit of the electronic device; obtaining first identification data comprises: obtaining a first texture of the operating body via a texture acquiring unit of the electronic device, the first identification data being the first texture.

Optionally, obtaining a first texture of the operating body via the texture acquiring unit of the electronic device comprises: detecting that a movement speed of the operating body is less than a predetermined threshold, and then acquiring the first texture via the texture acquiring unit.

Optionally, the method further comprises: obtaining a first movement parameter in relation to the motion of the operating body; deriving the first input data comprises: determining a first standard texture that matches the first texture from among standard textures based on the first texture and the first movement parameter; and determining the first input data based on the first standard texture.

Optionally, determining the first standard texture comprises: generating a first corrected texture based on the first movement parameter and the first texture; and determining a standard texture that matches the first corrected texture as the first standard texture; or generating analog textures based on the first movement parameter and the standard textures; and determining an analog texture that matches the first texture as a first analog texture, the first standard texture corresponding to the first analog texture.

Optionally, obtaining first track data comprises: acquiring at least two frames of image that includes the operating body via an image acquiring unit, any two frames among the at least two frames are acquired at different time; and determining the first track data according to a position change of the operating body from the at least two frames of image; obtaining first identification data comprises: acquiring an image of the operating body via the image acquiring unit; and determining the first identification data from the acquired image.

Optionally, the first input data comprises instruction data for controlling the electronic apparatus.

Optionally, the instruction data comprises an instruction to adjust a brightness of the electronic apparatus.

Optionally, obtaining the first track data comprises: recording a position parameter of a contact point between the operating body and the touch control unit and a movement direction parameter of the contact point.

Another aspect of the present application provides an electronic device, comprising: a track obtaining module configured to obtain first track data of a motion of an operating body; an identification obtaining module configured to obtain first identification data of the operating body; an input data obtaining module configured to obtain first input data corresponding to the first identification data; and a data responding module configured to respond to the first input data.

Optionally, the track obtaining module is specifically configured to: obtain first track data of the operating body via a touch control unit of the electronic device; the identification obtaining module is specifically configured to: obtain a first texture of the operating body via a texture acquiring unit of the electronic device, the first identification data being the first texture.

Optionally, the identification obtaining module is specifically configured to: detect that a movement speed of the operating body is less than a predetermined threshold, and then acquire the first texture via the texture acquiring unit.

Optionally, the electronic device further comprises a movement parameter obtaining module configured to obtain a first movement parameter in relation to the motion of the operating body.

Optionally, the input data obtaining module is specifically configured to: determine a first standard texture that matches the first texture from among standard textures based on the first texture and the first movement parameter; and determine the first input data based on the first standard texture.

Optionally, the input data obtaining module is specifically configured to: generate a first corrected texture based on the first movement parameter and the first texture; and determine a standard texture that matches the first corrected texture as the first standard texture; or generate analog textures based on the first movement parameter and the standard textures; and determine an analog texture that matches the first texture as a first analog texture, the first standard texture corresponding to the first analog texture.

Optionally, the track obtaining module is specifically configured to: acquire at least two frames of image that includes the operating body via an image acquiring unit, any two frames among the at least two frames are acquired at different time; and determine the first track data according to a position change of the operating body from the at least two frames of image; the identification obtaining module is specifically configured to: acquire an image of the operating body via the image acquiring unit; and determine the first identification data from the acquire image.

Optionally, the track obtaining module is specifically configured to: record a position parameter of a contact point between the operating body and the touch control unit, and a movement direction parameter of the contact point.

Optionally, the first input data comprises instruction data for controlling the electronic apparatus.

Optionally, the instruction data is an instruction to adjust a brightness of the electronic apparatus.

BRIEF DESCRIPTION OF THE DRAWINGS

In order to more clearly illustrate the technical solutions in the embodiments of the present application, drawings necessary for describing the embodiments will be briefly introduced below, obviously, for those of ordinary skill in the art, it is possible to attain other drawings based on these drawings without paying creative effort.

DETAILED DESCRIPTION

Hereinafter, the technical solutions will be described in detail with reference to the accompanying drawings and the specific embodiments, it should be understood that embodiments of the present application and specific features thereof are detailed descriptions of the technical solutions of the present application, rather than limitations to the technical solutions of the present application, in the case of no conflict, the embodiments of the present application and specific features thereof may be combined.

The electronic device in the embodiments of the present application may be smart phones, tablet PCs, laptops, smart watches, and other devices.

First Embodiment

Figure 1:
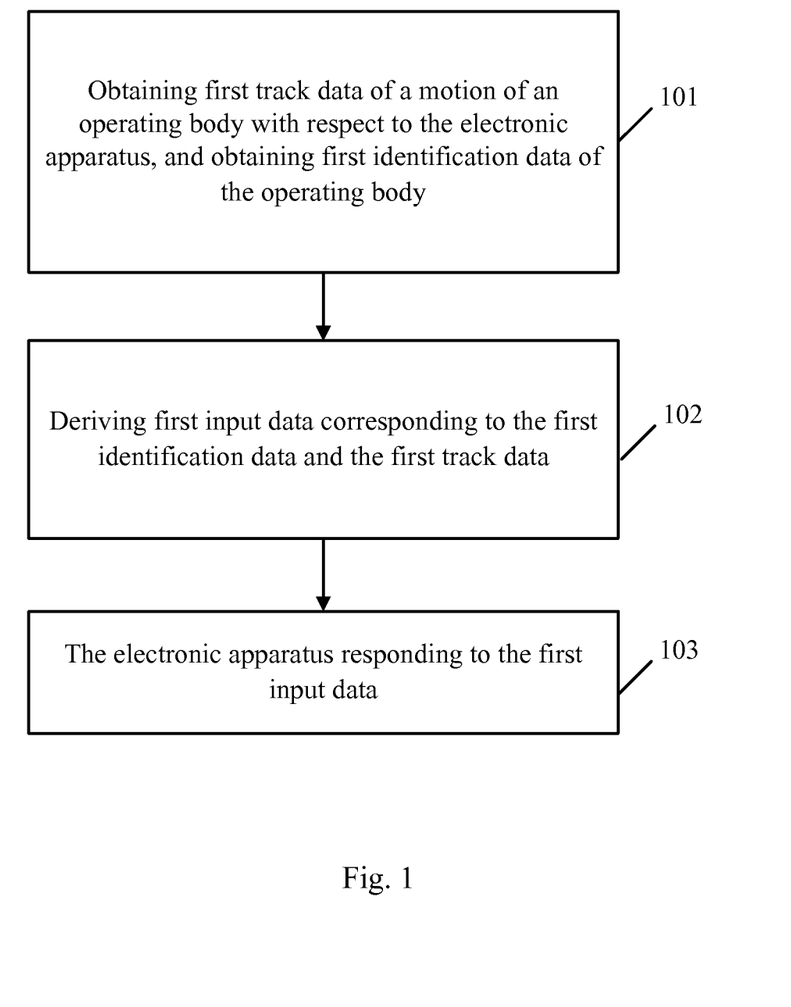
FIG. 1 is a schematic flowchart of the information processing method according to a first embodiment of present application.

The electronic device in the embodiment of the present application may be smart phones, tablet PCs, laptops, smart watches, and other devices. Referring to FIG. 1, FIG. 1 is a schematic flowchart of the information processing method in the embodiment of present application, the flows include the following steps:

step 101: obtaining first track data of a motion of an operating body with respect to the electronic apparatus, and obtaining first identification data of the operating body;

step 102: deriving first input data corresponding to the first identification data and the first track data; and step 103: the electronic apparatus responding to the first input data.

In particular, in step 101, the user performs an input operation through an operating body, which may be a finger, a palm, an artificial limb, a stylus, etc. of the user. The first track data is an input track when the operating body is performing an input operation, when the operating body performs a touch input operation, the first track data is a touch track of the operating body on the touch screen; when the operating body performs an input through an air gesture, the first track data is data that records the movement of the operating body in the air. Optionally, the first track data includes a shape of movement track of the operating body and a movement direction parameter of the operating body, for example, the track data can suggest not only that the movement track of the operating body is a horizontal straight line, but also that the movement direction of the operating body is from left to right.

The first identification data is data acquired by the electronic device for distinguishing different operating bodies, for example, when the user performs a touch input via a finger, the first identification data may be fingerprint of the finger; when the user performs a touch input via a palm, the first identification data may be palmprint of the palm; when the user performs an input via a stylus, it is possible to assign a unique identifier to each stylus, such as a manufacture label or a head serial number, the electronic device can acquire this identifier when the stylus touches the touch screen, this identifier is identification data of the stylus; another example, when the user performs an input through air gesture, the first identification data is an image that includes the finger that is performing the input, the electronic device can, by analyzing the image, determine which finger this finger specifically is based on a relative position relationship between fingers.

In step 101, when the user performs an input operation by moving the operating body, the electronic device can obtain the first track data, in particular, it is possible to obtain the first track data when movement of the operating body ends during one movement input operation, or obtain the first track data during the movement of the operating body, for example, a finger slides rightward on the touch screen, there is no need to wait the whole rightward sliding of the finger to end, it may be determined that the first track data is a track that slides rightward after detecting that the finger slides rightward for a certain length.

The first identification data is obtained during the inputting process, that is, it is obtained during the movement of the operating body. In particular, the first identification data may be obtained at an initial stage of the movement of the operating body, or at an intermediate stage of the movement of the operating body, or an end stage of the movement of the operating body.

In step 102, the input data may be character data (such as a Chinese character or a Latin alphabet), may also be instruction data (such as an instruction to lower screen brightness). The set of correspondence is a set of correspondence among identification data, track data, and input data as stored by the electronic device, thus the corresponding input data can be determined through the track data, the identification data, and the correspondence among the three. For example, after acquiring the fingerprint of the finger that performs the input operation and the track data of the input operation performed on the touch screen, it is possible to determine one item of input information through the correspondence from the set of correspondence.

Since it is possible to make tracks of different operating bodies correspond to different input data, and different tracks of the same operating body correspond to different input data, so that the user can input a large amount of input data via combination of a limited number of operating bodies and a limited number of tracks. In the case of rational combination of the three of identification data, track data, and input data, it is totally possible to make an input operation instead of a keyboard. For example, as for four fingers of a hand, from the ring finger to the thumb, each finger may have four tracks, upward, downward, leftward, and rightward, in this way, the two hands of the user have thirty-two combinations of finger and track, each combination corresponds to one item of input data, which can totally cover the twenty-six letters from A to Z, and thereby completely replace the keyboard to perform a data input.

In practice, when an input operation is performed with an operating body moving on the touch screen, since the operating body normally produces deformation, such as the finger, palm may produce deformation under the action of reaction force and frictional force of the touch screen when the finger, palm slides on the touch screen. The identification data in the set of correspondence is standard identification data stored by the electronic device for identifying the operating body, the standard identification data is acquired under certain standard conditions, for example, the identification data of the index finger is fingerprint data acquired when the index finger faces a fingerprint collector. Because shape of the contact surface between the index finger and the touch screen when the index finger moves on the touch screen is different than shape of the contact surface when acquiring the standard identification data, the first identification data (first fingerprint) acquired when the finger moves has difference with respect to the identification data in the set of correspondence. Therefore, when an input operation is performed with an operating body moving on the touch screen, after obtaining the first identification data, it needs to further determine the identification data corresponding to the acquired first identification data from the set of correspondence.

In step 103, the electronic device will respond to the determined first input data, when the input data is character data, then the character data is input in a corresponding text editing area; when the input data is instruction data, then a corresponding instruction is executed.

In the above technical solution of the present application, when the operating body performs an input operation through movement, the track data of the operating body can be obtained and the identification data of the operating body can be obtained during the inputting process, and also, the corresponding input data can be determined in conjunction with the correspondence in the set of correspondence. Since it is possible to make tracks of different operating bodies correspond to different input data, and different tracks of the same operating body correspond to different input data, so that the user can input a large amount of input data via combination of a limited number of operating bodies and a limited number of tracks.

In comparison to inputting with a physical keyboard and a virtual keyboard, the input area for each input data in the embodiment of present application is much larger than the operating area when inputting with the physical keyboard and the virtual keyboard, which improves the user' operating experience and reduces erroneous input. And in comparison to handwriting input, since recognition rate of the input track and the operating body is much larger than that of handwritten characters, input speed and accuracy are greatly improved.

In the embodiment of the present application, performing an input operation by the operating body may specifically be divided into moving on the touch screen to perform an input operation and moving in the air to perform an input operation, which will be described individually below.

First input manner: an operating body moves on the touch screen to perform an input operation.

Figure 2:
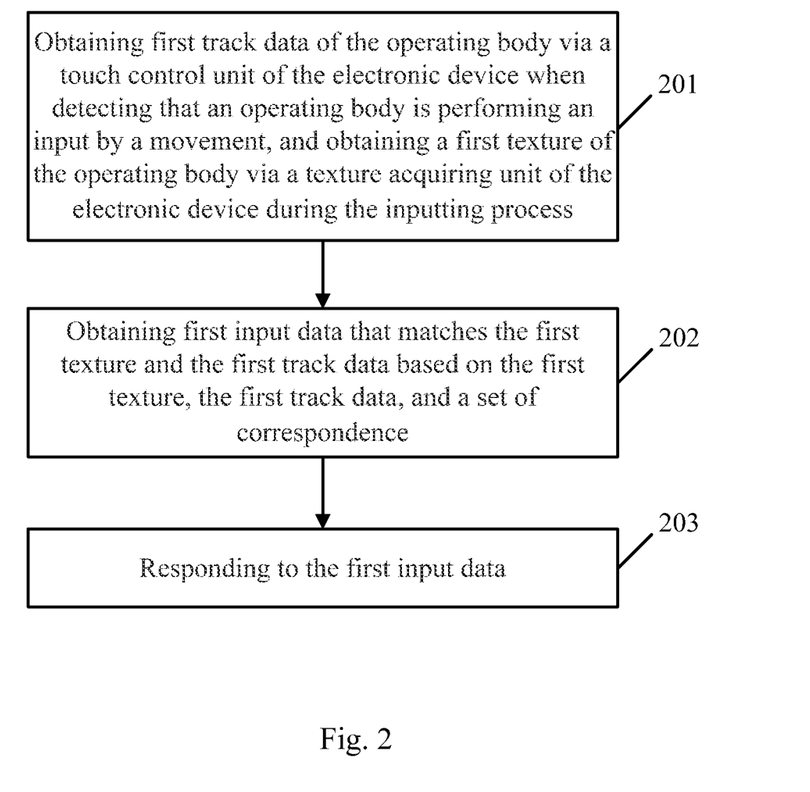
FIG. 2 is a schematic flowchart of a first input manner according to the first embodiment of the present application.

Referring to FIG. 2, FIG. 2 is a schematic flowchart of a first input manner according to the first embodiment of the present application, the flows include:

step 201: obtaining first track data of the operating body via a touch control unit of the electronic device when detecting that an operating body is performing an input by a movement, and obtaining a first texture of the operating body via a texture acquiring unit of the electronic device;

step 202: obtaining first input data that matches the first texture and the first track data based on the first texture, first track data, and a set of correspondence; and step 203: responding to the first input data.

In particular, in step 201, the electronic device can obtain the track data of the operating body via a touch control unit, the touch control unit may be a resistive touch sensing unit, a capacitive touch sensing unit, a SAW (surface acoustic wave) touch sensor unit, etc. As for those skilled in the art to which the embodiment of the present application pertains, they can clearly know how to obtain the track data of the operating body via a touch control unit, no more details repeated herein.

The texture data in step 201 is a type of identification data, which may specifically be fingerprint of a finger, or palmprint of a palm, etc. The electronic device obtains the texture data via a texture acquiring unit in particular. The texture acquiring unit is integrated or overlapped with the touch control unit; it may overlap with the entire touch control area of the touch control screen, or only a partial touch control area of the touch control screen. In addition, the texture acquiring unit may be formed by an array consisting of several texture acquiring modules, adjacent texture acquiring modules in the array are close enough to make texture data be always acquired when the user moves on the screen where arrays overlap; the texture acquiring unit may also be a single texture acquiring module with wider working coverage and higher working accuracy, because of the wider working coverage, the operating body can perform an input through movement on a screen area to which the working coverage of the texture acquiring module corresponds.

In the embodiment of the present application, texture data may be acquired at an arbitrary stage during the movement of the operating body. For example, it is possible to acquire the texture data at an initial stage of the movement of the operating body, or at a midway stage (intermediate stage) of the movement of the operating body, or at a stage before the movement of the operating body ends.

Optionally, when the operating body performs an input operation through movement, texture data at a predetermined time after the operating body begins to move is obtained as the first texture data.

In particular, after the operating body moves for a certain period of time, the speed of the operating body and the force between the operating body and the touch screen become more stable, location and shape of the contact surface between the operating body and the touch screen become more stable, shape of the texture data acquired at this moment is more stable and has less fluctuation, which facilitates determining the corresponding identification data in the set of correspondence. In practice, the predetermined time may be set with reference to screen area, friction coefficient etc., the user may change the predetermined time according to his/her own habits.

In addition, in the embodiment of the present application, acquiring texture data during the movement of the operating body comprises acquiring in the situation that the operating body moves at a certain speed, and acquiring in the situation that the speed of the operating body is close to or equal to zero. For the latter, during the movement of the operating body, the texture acquiring unit may acquire the texture data of the operating body when the operating body moves at a certain position of the texture detection area and then stops or moves slowly at a speed close to zero, the texture data acquired at this moment is the same as the text data stored in the set of correspondence or their difference is neglectable, so as to rapidly determine the "identity" of the operating body.

Optionally, during the movement of the operating body, if it is detected that a movement speed of the operating body is less than a predetermined threshold, then the first texture is acquired via the texture acquiring unit.

In particular, when the movement speed of the operating body is relatively small, deformation produced by the operating body that maintains a contact status with the touch screen is neglectable, accordingly, the difference between the acquired first texture and the standard texture of the operating body is quite small or negligible, thus acquiring the first texture in the case that the movement speed of the operating body is less than a certain value can rapidly determine the texture data to which the first texture corresponds from the set of correspondence, and thereby determine the first input data corresponding to the first texture and the first track data.

As for steps 202 to 203, theirs implementations are the same as those of steps 102 to 103, and can be clearly learned with reference to the description on steps 102 to 103, no more detail described in the embodiment of the present application.

With the above technical solution, input data can be input rapidly, accurately, and conveniently.

Further, in a preferred embodiment of the first input manner, the electronic device needs to further obtain a movement parameter of the operating body, so as to determine the texture data corresponding to the acquired first texture from the set of correspondence based on the movement parameter.

Figure 3:
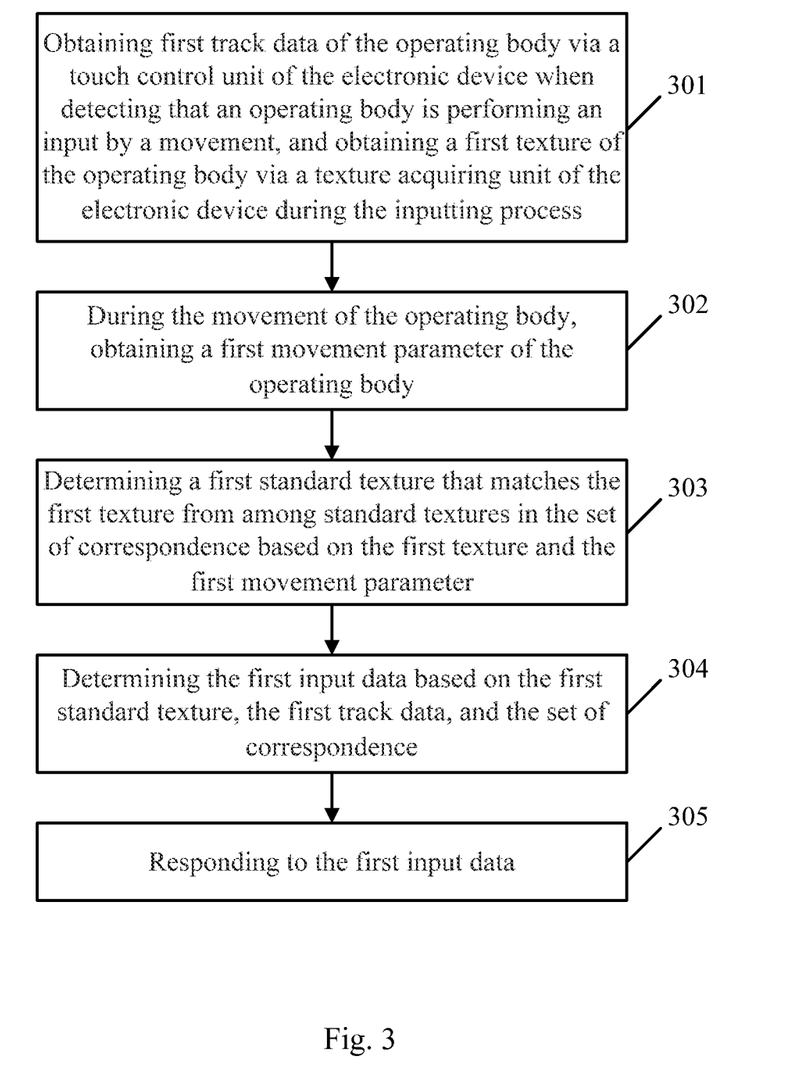
FIG. 3 is another schematic flowchart of the first input manner according to the first embodiment of the present application.

Referring to FIG. 3, FIG. 3 is another schematic flowchart of the first input manner according to the first embodiment of the present application, the flows include the following steps:

step 301: obtaining first track data of the operating body via a touch control unit of the electronic device when detecting that an operating body is performing an input by a movement, and obtaining a first texture of the operating body via a texture acquiring unit of the electronic device during the inputting process;

step 302: during the movement of the operating body, obtaining a first movement parameter of the operating body;

step 303: determining a first standard texture that matches the first texture from among standard textures in the set of correspondence based on the first texture and the first movement parameter;

step 304: determining the first input data based on the first standard texture, the first track data, and the set of correspondence; and step 305: responding to the first input data.

In particular, implementation of step 301 is the same as that of step 201.

In step 302, the first movement parameter of the operating body may be a movement direction parameter and/or a movement speed parameter and/or a pressure distribution parameter of the operating body. Among them, the touch control unit can determine the movement direction parameter and the movement speed parameter based on data of a contract point with the operating body. In addition, the movement direction parameter and the movement speed parameter may also be determined based on track shape data contained in the first track data and the movement direction parameter of the operating body. While the pressure distribution parameter is acquired by a pressure sensing unit of the electronic device, or determined by a deformation parameter of the touch screen when the touch screen is a deformable screen.

In the embodiment of the present application, the first movement parameter may be acquired while acquiring the first texture, after acquiring the first texture, or before acquiring the first texture.

In step 303, the standard textures are standard identification data stored by the electronic device for identifying the operating body, and usually are obtained when the operating body is still, for example, fingerprint data acquired when the fingerprint area of a finger faces the touch screen and presses, after a standard texture is identified, it will be determined undoubtedly that which finger the corresponding finger is. In the embodiment of the present application, the first texture is obtained during the movement of the operating body, the acquired texture data will produce certain deformation due to the movement of the operating body, and thus it needs to determine a standard texture corresponding to the first texture from the set of correspondence.

Since the deformation of the first texture in comparison to a corresponding standard texture is relevant to the movement status of the operating body, that is, relevant to the first movement parameter, a standard texture corresponding to the first texture from the set of correspondence can be determined rapidly, conveniently, and accurately in conjunction with the first movement parameter.

In particular, step 303 may have the following two implementations.

First implementation: generating a first corrected texture based on the (first) movement parameter and the first texture; and determining a standard texture that matches the first corrected texture as the first standard texture.

First of all, the first texture is corrected based on the first movement parameter to obtain the first corrected texture, which specifically includes:

Firstly, a texture pattern deformation correction is performed on the first texture based on the movement direction parameter, to cause the shape of the first texture to produce a deformation in a direction toward the movement direction parameter. For example, referring to FIG. 4a, dashed line therein is line in the standard texture, solid line is corresponding line in the acquired first texture, the solid line produces a leftward deformation relative to the dashed line, this is because when a finger slides rightward, a contact part between the finger and the touch screen produces a leftward deformation under the action of frictional force, so that the line in the pattern of the acquired first texture has a leftward deviation. Thus, a rightward correction may be performed on the pattern of the first fingerprint, so that the obtained first corrected fingerprint matches the first standard fingerprint corresponding to the finger.

In practice, during the movement of the operating body, different parts of the contact surface between the operating body and the touch screen may probably produce deformation in different degrees due to frictional force. Referring FIG. 4a, when the finger slides rightward, the right side of the contact surface has a larger deformation, the left side of the contact surface has a smaller deformation, so that in the acquired texture data, the right area has a larger difference in comparison to the corresponding area in a standard fingerprint, whereas the left area has a smaller difference in comparison to the corresponding area in the standard fingerprint.

Figure 4A:
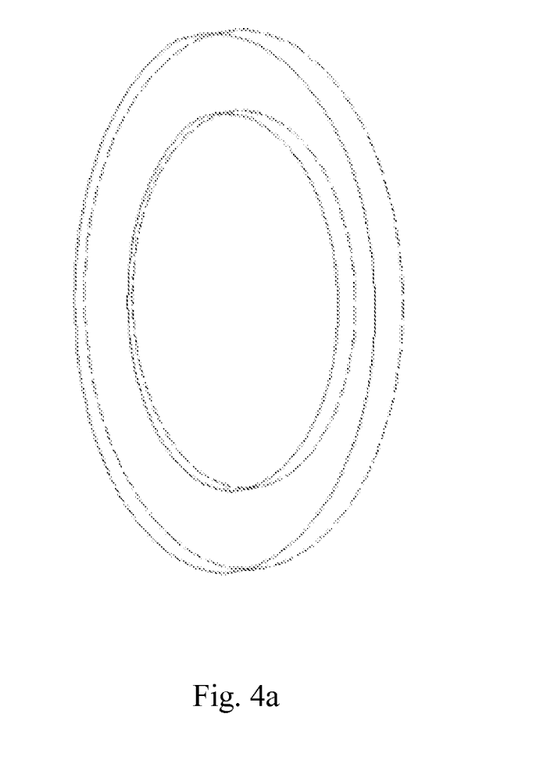
FIG. 4a is a schematic diagram illustrating that the texture data acquired in the first embodiment of the present application produces deformation.

Secondly, when a texture pattern deformation correction is performed on the first texture based on the movement direction parameter, an amplitude of correcting the pattern is in a positive correlation with a movement speed (acceleration) parameter of the operating body in an inputting status. In other words, the faster the movement speed of the operating body is, the larger the amplitude of correcting the first texture with the movement direction parameter is.

Figure 4B:
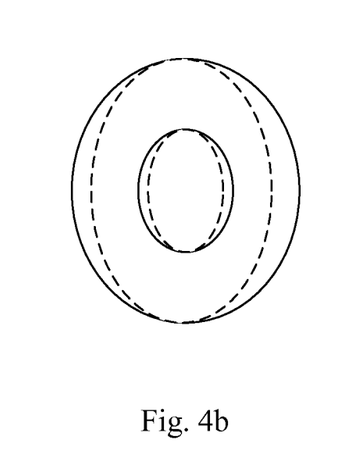
FIG. 4b is another schematic diagram illustrating that the texture data acquired in the first embodiment of the present application produces deformation.

Thirdly, a shape correction is performed on the first texture based on a pressure distribution parameter of the operating body, to cause the texture line at a stress point of the first texture to produce a shrink deformation toward inside of the texture line. This is because during the movement of the operating body, referring to FIG. 4b, dashed line therein is line in a standard texture, and sold line is corresponding line in the acquired first texture, the solid line produces an outward expansion with respect to the dashed line, because the force pressing on the touch screen is too large, the operating body like the finger, the palm and so on will produce a flattening deformation, accordingly, the line in the acquired first texture also produces an outward expansion deformation with regard to the line in the standard texture. Thus, a shirk deformation toward inside of the texture pattern may be performed on the pattern of the first fingerprint, so that the acquired first corrected fingerprint matches with the first standard fingerprint corresponding to the finger. Optionally, relevant pressure data when acquiring the standard texture may be recorded, and correction is performed only on a texture area whose pressure is larger than an operating body pressure to which a standard texture corresponds during the correction.

Thereafter, a match computation is performed between the first corrected texture and standard textures in the set of correspondence.

Second implementation: generating analog textures based on the (first) movement parameter and all standard textures in the set of correspondence, each of the analog textures corresponding to one standard texture one by one; and determining an analog texture that matches the first texture as a first analog texture, the first standard texture being a standard texture corresponding to the first analog texture.

First, correction is performed on all standard texture data in the set of correspondence based on the first movement parameter. In the first implementation discussed above, generating the first corrected texture is performing an inverse correction on the first texture, in contrast, correcting the standard textures is simulating texture data acquired when the operating body performs an input through movement, thus the correction manner for the standard textures in the second implementation is opposite to the texture correction manner in the first implementation, which specifically includes:

Firstly, a texture pattern deformation correction is performed on each standard texture based on the movement direction parameter, to cause the shape of the first texture to produce a deformation in a direction opposite the movement direction parameter.

Secondly, when a texture pattern deformation correction is performed on a standard texture based on the movement direction parameter, an amplitude of correcting the pattern is in a positive correlation with a movement speed (acceleration) parameter of the operating body in an inputting status.

Thirdly, a shape correction is performed on the first texture based on a pressure distribution parameter of the operating body, to cause the texture line at a stress point of the first texture to produce a shrink deformation toward outside of the texture line. Optionally, relevant pressure data when acquiring the standard texture may be recorded, and correction is performed only on a texture area whose pressure is larger than an operating body pressure to which a standard texture corresponds during the correction.

Thereafter, a match computation is performed between each analog texture and the first texture, so as to determine the first analog texture that matches the first texture, and thereby determine a standard texture corresponding to the first analog texture as the first standard texture.

Implementations of steps 304-305 are the same as those of steps 102 to 103, no more details repeated herein.

With the above technical solution, when performing an input through movement of the operating body, texture data of the operating body can be obtained when the operating body moves at a certain speed, and thereby "identity" of the operating body can be determined based on the acquired texture data; during the same moving operation when the user inputs fingerprint, it is also possible to acquire a movement track of the operating body, that is, during a one-time input operation of the operating body, both texture data and track data of the operating body are obtained. In the prior art, it needs to first acquire texture data that authenticates an identity of an operating body when the operating body is in a still status, and then acquire movement track of the operating body, in substance, the user needs to perform two input operations (inputting texture and track, respectively). Thus, the above technical solution not only can implement convenient, rapid input of a large amount of input data, and additionally, the first texture of the operating body is obtained during the movement of the operating body, input efficiency is higher, input operation is more smooth, fast, and consumes less time.

Optionally, in the embodiment of the present application, during the movement of the operating body, two items of texture data of the operating body are acquired, time of acquiring the two items of texture data is different; thereafter, corresponding standard texture is determined from the set of correspondence based on the movement parameter, respectively, and when it corresponds to the same standard texture two times, a proper correspondence is determined, if not, another item of texture data is acquired, and again a standard texture is determined based on the movement parameter, so as to authenticate which one of the two correspondences is proper. When matching with standard textures, it is possible to select different movement parameters for the acquired different texture data, optionally, a movement parameter may be selected while acquiring texture data; when the operating body moves smoothly, the movement parameter maintains relatively stable, in this case, it is possible to use the same movement parameter.

In practice, several texture data may be acquired and matched with a corresponding standard texture based on the movement parameter, a standard texture with the highest number of times of being matched as a correspondence is recognized as the standard texture corresponding to the operating body, or alternatively, a standard texture is recognized as the standard texture corresponding to the operating body when the number of times of being deemed as a match arrives at a certain ratio.

Determining a matched standard texture in the set of correspondence by acquiring texture data at different moments can reduce an offset that may appear during a one-time match, and thereby improve accuracy of identifying the operating body.

Second input manner: the operating body performs an input through an air movement.

Figure 5:
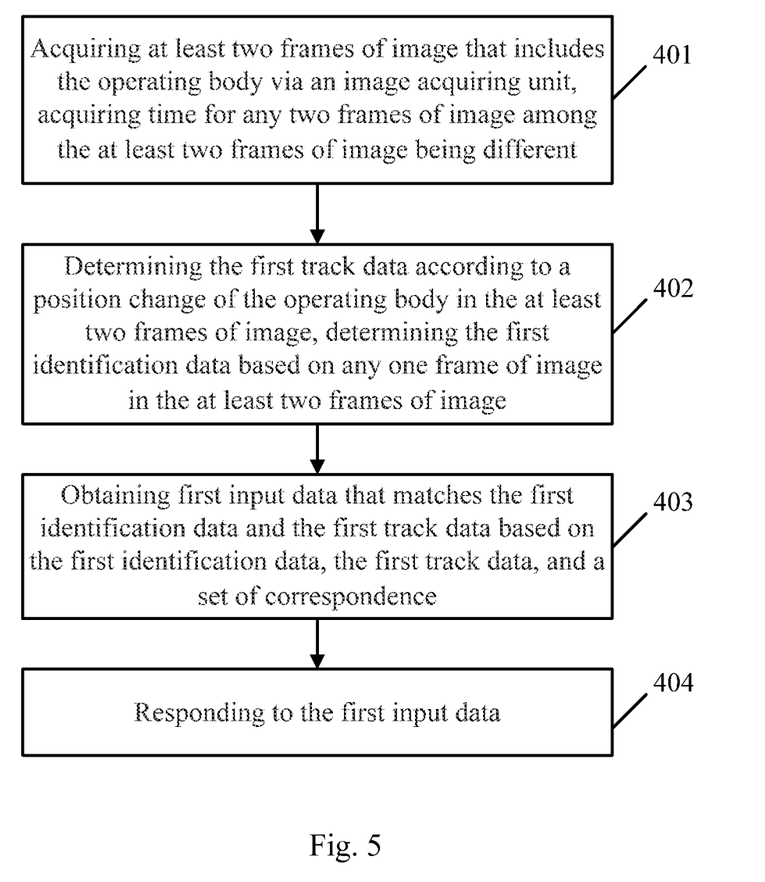
FIG. 5 is a schematic flowchart to which a second input manner according to the first embodiment of the present application corresponds.

Referring to FIG. 5, FIG. 5 is a schematic flowchart to which a second input manner according to the first embodiment of the present application corresponds, the flows include:

step 401: acquiring at least two frames of image that includes the operating body via an image acquiring unit, acquiring time for any two frames of image among the at least two frames of image being different;

step 402: determining the first track data according to a position change of the operating body in the at least two frames of image, determining the first identification data based on any one frame of image in the at least two frames of image;

step 403: obtaining first input data that matches the first identification data and the first track data based on the first identification data, the first track data, and a set of correspondence; and step 404: responding to the first input data.

In particular, the image acquiring unit in step 401 may be an inherent image acquiring unit of the electronic device, and may also be an external image acquiring unit that can be controlled by the electronic device through signaling interaction. At least two frames of image including the operating body may be acquired by the image acquiring unit, in practice, to facilitate determination of the first track data of the operating body, it is possible to acquire several images including the operating body in accordance with a predetermined cycle.

Optionally, during the movement of the operating body, the image acquiring unit moves accordingly along with the movement of the operating body, so that the operating body is always within a shooting range of the image acquiring unit.

Optionally, image may be acquired via two or more image acquiring units, so as to determine the identification data and the track data of the operating body based on a larger number of image data from more angles.

In step 402, identity of the operating body may be determined based on a position status of the operating body in image, this identity is the identification data. For example, when the user performs an input by means of moving in the air, if, in the acquired image, only one finger of one hand is straight, the other fingers are bent, then it is determined that straight finger is the operating body, and it can be determined which finger the straight finger is in particular based on a relative position relationship between the straight finger and other fingers (such as the thumb).

As for the first track data, a track shape of the operating can be simulated, as long as there are a sufficient number of images at different moments, and in conjunction with time relationship of acquiring each image (sequence of acquiring images), the movement direction parameter of the operating body can be determined.

As for steps 403-404, their implementations are the same as those of steps 102-103, no more details repeated herein.

Image of the operating body is acquired via the image acquiring unit, thereby identification data and track data of the operating body can be determined, and further, input information can be determined based on the set of correspondence, so that the user can input a large amount of input data rapidly, conveniently, and accurately in manner of moving the operating body in air.

Further, obtaining the first track data comprises: recording a position parameter of a contact point between the operating body and the touch control unit and a movement direction parameter of the contact point. In particular, the movement direction parameter may be a movement direction of the operating body at each contact point, or a time sequence relationship of respective contact points, the movement direction of the operating body can be learned through the movement direction parameter.

By means of determining the movement direction parameter of the operating body, it is possible to further broaden dimension of the movement track data of the operating body, which greatly increases an operating track to which an operating body may correspond, and thereby increases the number of the corresponding input data, enrich the data amount that can be input by an input operation.

Optionally, each operating body of the user is associated with at least one item of input data, each item of input data with which the operating body is associated corresponds to one track, one track of one operating body corresponds to one item of input data.

Figure 6:
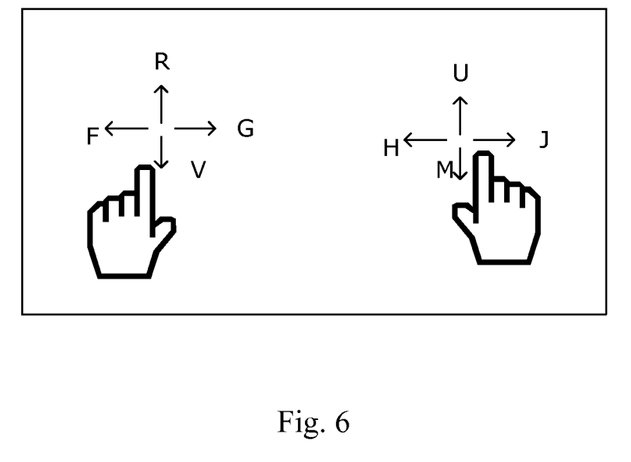
FIG. 6 is a schematic diagram illustrating that the operating body in the first embodiment inputs a character through movement.

For example, referring to FIG. 6, character "R" is input when the index finger of the user' left hand slides upward, character "G" is input when it slides rightward, character "V" is input when it slides downward, and character "F" is input when it slides leftward; whereas character "U" is input when the index finger of the user' right hand slides upward, character "J" is input when it slides rightward, character "M" is input when it slides downward, and character "H" is input when it slides leftward.

In a specific implementation, correspondence among the three of identification data, track data, and input data in the set of correspondence may be consistent with the input habits of the user on a physical keyboard, for example, when the user uses a physical keyboard, he/she uses the index finger of the left hand to input four characters "R", "G", "V", "F", thus these four characters are made to correspond to the index finger of the left hand, then according to the relative position relationship among the four characters on a physical keyboard, character "R" is made to correspond to upward track data, character "V" is made to correspond to downward track data, character "F" is made to correspond to leftward track data, and character "G" is made to correspond to rightward track data. When associating each input data (character) with a correspondence in accordance with the aforesaid mode, the user can perform an input operation in a using habit corresponding to that of using a physical keyboard, without deliberately remembering the fingers and tracks corresponding to these characters, study cost low enables the user to input efficiently and rapidly, and achieves fast typing without looking at the prompts on the screen.

In practice, the track data may also include oblique track, for example, character "T" is input when the index finger of the left hand slides toward the upper right corner; the trace data may also include graphics, character "@" is input when the ring finger of the right hand draws a triangle, and character "&" is input when it draws a circle. In this way, since it is possible to make tracks of different operating bodies correspond to different input data, and different tracks of the same operating body correspond to different input data, so that the user can input a large amount of input data via combination of a limited number of operating bodies and a limited number of tracks.

Optionally, after determining the identification data for the acquired first standard data in the set of correspondence, the input data associated with the operating body can be displayed via a display unit of the electronic device; optionally, while displaying the associated input data, a track corresponding to each input data is displayed, so as to prompt the user with characters available to be input.

Optionally, after determining the identification data for the acquired first standard data in the set of correspondence, only the first track that adapts to the current first track data and a corresponding track are displayed.

For example, it is set that four input data associated with the thumb of the right hand respectively are: character "Y" corresponding to track "⌐", character "B" corresponding to track "⌐", character "G" corresponding to track "—", and character "V" corresponding to track "/". After determining that the operating body is the thumb of the right hand, when it is detected that the current operating body forms a track "—", but the thumb of the right hand still is moving, the current tracks"—" "⌐" "⌐" all adapt, these three tracks and the characters corresponding to them can be displayed via a display unit, so as to prompt the user with characters available to be input in real time.

Optionally, when there are at least two operating bodies in an inputting status, an corresponding item of input data is determined based on the acquired operating track of each operating body of the at least two operating bodies. In other words, a plurality of operating bodies perform an input operation concurrently is equivalent to input a set of "keys", accordingly, an item of input data is determined, which increases the amount of input data that can be input by the user during a single input operation.

Optionally, when there are at least two operating bodies in a moving status, an operating track of each operating body is obtained, the operating body to which the operating track with a maximum amplitude corresponds in an operating range is determined as the operating body in the inputting status, and thereby avoiding an error input caused by that the operating body in the inputting status drives the other operating bodies to move.

Second Embodiment

Figure 7:
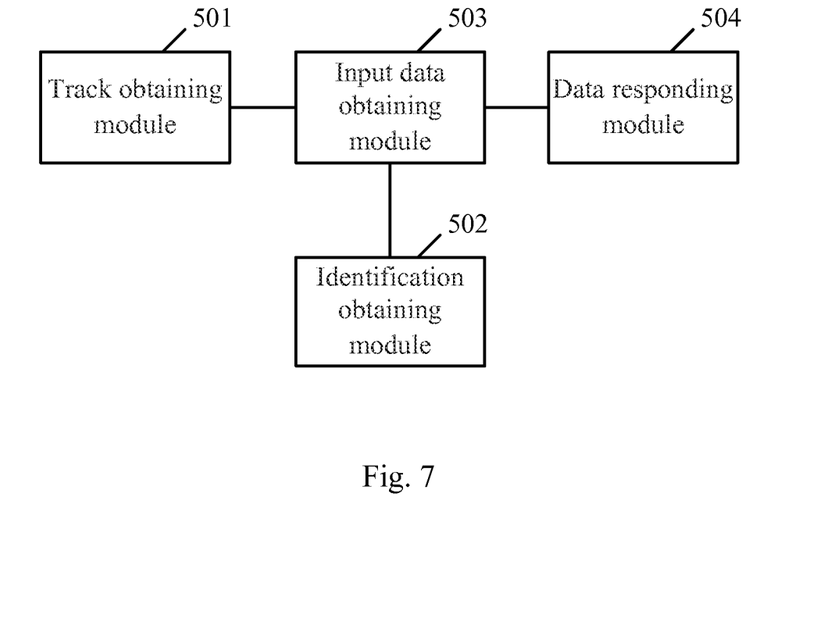
FIG. 7 is a schematic block diagram of the electronic device according to a second embodiment of the present application.

Based on the same technique concept, an embodiment of the present application further provides an electronic device, which may be smart phones, tablet PCs, laptops, smart watches, and other devices. Referring to FIG. 7, FIG. 7 is a schematic block diagram of the electronic device, comprising:

a track obtaining module 501 configured to obtain first track data of a motion of an operating body;

an identification obtaining module 502 configured to obtain first identification data of the operating body;

an input data obtaining module 503 configured to obtain first input data corresponding to the first identification data; and a data responding module 504 configured to respond to the first input data.

Further, the track obtaining module 501 is specifically configured to: obtain first track data of the operating body via a touch control unit of the electronic apparatus;

the identification obtaining module 502 is specifically configured to: obtain a first texture of the operating body via a texture acquiring unit of the electronic apparatus, the first identification data being the first texture.

In the above technical solution of the present application, when the operating body performs an input operation through movement, the track data of the operating body can be obtained and the identification data of the operating body can be obtained during the inputting process, and also, the corresponding input data can be determined in conjunction with the correspondence in the set of correspondence. Since it is possible to make tracks of different operating bodies correspond to different input data, and different tracks of the same operating body correspond to different input data, so that the user can input a large amount of input data via combination of a limited number of operating bodies and a limited number of tracks.

Further, the identification obtaining module 502 is specifically configured to: detect that a movement speed of the operating body is less than a predetermined threshold, and then acquire the first texture via the texture acquiring unit.

Figure 8:
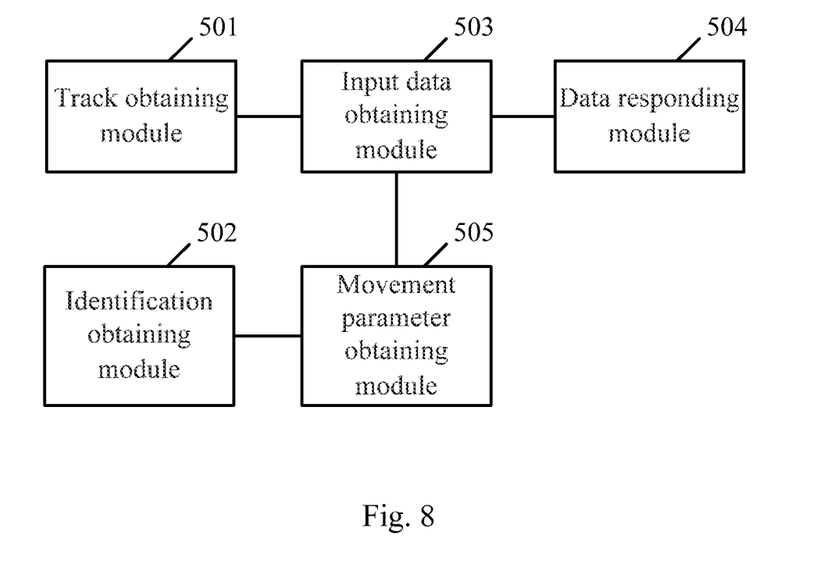
FIG. 8 is a schematic block diagram of the electronic device according to the second embodiment of the present application.

Further, the identification data included in the correspondence is standard identification data stored by the electronic apparatus for identifying the operating body; referring to FIG. 8, the electronic apparatus further comprises:

a movement parameter obtaining module 505 configured to, during the movement of the operating body, obtain a first movement parameter of in relation to the motion of the operating body;

the input data obtaining module 503 is specifically configured to: determine a first standard texture that matches the first texture from among standard textures based on the first texture; and determine the first input data based on the first standard texture.

Further, the input data obtaining module 503 is specifically configured to: generate a first corrected texture based on the first movement parameter and the first texture; and determine a standard texture that matches the first corrected texture as the first standard texture; or generate analog textures based on the first movement parameter and the standard textures; and determine an analog texture that matches the first texture as a first analog texture, the first standard texture corresponding to the first analog texture.

Further, the track obtaining module 501 is specifically configured to: acquire at least two frames of image that includes the operating body via an image acquiring unit, any two frames among the at least two frames are acquired at different time; and determine the first track data according to a position change of the operating body from the at least two frames of image;

the identification obtaining module 502 is specifically configured to: acquire an image of the operating body via the image acquiring unit; and determine the first identification data from the acquired image.

Further, the track obtaining module 501 is specifically configured to: record a position parameter of a contact point between the operating body and the touch control unit, and a movement direction parameter of the contact point.

Various information processing manners and detailed embodiments in the information processing method in the first embodiment discussed above also are applicable to the electronic device in this embodiment, based on the detailed description of the information processing method in the previous embodiment, those skilled in the art can clearly learn the implementations of the electronic device in this embodiment, for brevity of description, no more details repeated herein.

One or more technical solutions provided in embodiments of the present application at least have the following technical effects or advantages:

1. When the operating body performs an input operation through movement, the track data of the operating body can be obtained and the identification data of the operating body can be obtained during the inputting process, and also, the corresponding input data can be determined in conjunction with the correspondence in the set of correspondence. Since it is possible to make tracks of different operating bodies correspond to different input data, and different tracks of the same operating body correspond to different input data, so that the user can input a large amount of input data via combination of a limited number of operating bodies and a limited number of tracks.

2. In comparison to inputting with a physical keyboard and a virtual keyboard, the input area for each input data in the embodiment of present application is much larger than the operating area when inputting with the physical keyboard and the virtual keyboard, which improves the user' operating experience and reduces erroneous input. And in comparison to handwriting input, since recognition rate of the input track and the operating body is much larger than that of handwritten characters, input speed and accuracy are greatly improved.

3. The first texture of the operating body is obtained during the movement of the operating body, in comparison to the requirement of first acquiring the static texture data of the operating body in the prior art, the entire input operation is more smooth, fast, and consumes less time.

4. Image of the operating body is acquired via the image acquiring unit, thereby identification data and track data of the operating body can be determined, and further, input information can be determined based on the set of correspondence, so that the user can input a large amount of input data rapidly, conveniently, and accurately in manner of moving the operating body in air.

5. By means of determining the movement direction parameter of the operating body, it is possible to further broaden dimension of the movement track data of the operating body, which greatly increases an operating track to which an operating body may correspond, and thereby increases the number of the corresponding input data, enrich the data amount that can be input by an input operation.

Those skilled in the art should understand that, the embodiments of the present disclosure can be provided as a method, a system or a computer program product. Therefore, the present disclosure can adopt forms of a full hardware embodiment, a full software embodiment, or an embodiment combining software and hardware aspects. And, the present disclosure can adopt forms of a computer program product implemented on one or more computer usable storage mediums (including, but not limited to, magnetic disk storage, CD-ROM, optical memory, or the like) including computer usable program codes.

The present disclosure is described by referring to flow charts and/or block diagrams of method, apparatus (system) and computer program product according to the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

In particular, the computer program instructions to which the information processing method in the embodiments of the present application correspond can be stored in an optical disk, a hard disk, and other storage medium, when the computer program instructions corresponding to the information processing method as stored in the storage medium are read or executed by an electronic device, the following steps are comprised:

obtaining first track data when detecting that an operating body is performing an input by a movement, and obtaining first identification data during the inputting process, the first track data being track data corresponding to the movement of the operating body, the first identification data being data that identifies the operating body;

obtaining first input data that matches the first identification data and the first track data based on the first identification data, the first track data, and a set of correspondence, the set of correspondence including at least one item of correspondence, which is a correspondence among identification data, track data, and input data; and responding to the first input data.

Optionally, in the process that the computer instruction corresponding to the step of obtaining first track data as stored in the storage medium is executed, the following step is comprised in particular:

obtaining first track data of the operating body via a touch control unit of the electronic apparatus;

in the process that the computer instruction corresponding to the step of obtaining first identification data during the inputting process is executed, the following step is comprised in particular:

obtaining a first texture of the operating body via a texture acquiring unit of the electronic apparatus during the inputting process, the first identification data being the first texture.

Optionally, in the process that the computer instruction corresponding to the step of obtaining a first texture of the operating body via a texture acquiring unit of the electronic apparatus during the inputting process as stored in the storage medium is executed, the following step is comprised in particular:

during the movement of the operating body, if it is detected that a movement speed of the operating body is less than a predetermined threshold, then acquiring the first texture via the texture acquiring unit.

Optionally, there are other computer instructions stored in the computer medium, in the process that these computer instructions are executed before the computer instruction corresponding to the step of obtaining first input data that matches the first identification data and the first track data based on the first identification data, the first track data, and a set of correspondence is executed, the following steps are comprised in particular:

during the movement of the operating body, obtaining a first movement parameter of the operating body;

obtaining first input data that matches the first identification data and the first track data based on the first identification data, the first track data, and a set of correspondence comprises:

determining a first standard texture that matches the first texture from among standard textures in the set of correspondence based on the first texture and the first movement parameter, the standard identification data being the standard textures; and determining the first input data based on the first standard texture, the first track data, and the set of correspondence.

Optionally, in the process that the computer instruction corresponding to the step of determining a first standard texture that matches the first texture from among standard textures in the set of correspondence based on the first texture and the first movement parameter as stored in the storage medium is executed, the following steps are comprised in particular:

generating a first corrected texture based on the first movement parameter and the first texture; and determining a standard texture that matches the first corrected texture as the first standard texture;

or generating analog textures based on the first movement parameter and all standard textures in the set of correspondence, each of the analog textures corresponding to one standard texture one by one; and determining an analog texture that matches the first texture as a first analog texture, the first standard texture being a standard texture corresponding to the first analog texture.

Optionally, in the process that the computer instruction corresponding to the step of obtaining first track data as stored in the storage medium is executed, the following steps are comprised in particular:

acquiring at least two frames of image that includes the operating body via an image acquiring unit, acquiring time for any two frames of image among the at least two frames of image being different; and determining the first track data according to a position change of the operating body in the at least two frames of image;

in the process that the computer instruction corresponding to the step of obtaining first identification data during the inputting process as stored in the storage medium is executed, the following steps are comprised in particular:

acquiring an image of the operating body via the image acquiring unit; and determining the first identification data based on the image.

Optionally, in the process that the computer instruction corresponding to the step of obtaining the first track data as stored in the storage medium is executed, the following step is comprised in particular:

recording a position parameter of a contact point between the operating body and the touch control unit and a movement direction parameter of the contact point.

Although the preferred embodiments of the present disclosure have been described, those skilled in the art can make additional changes and modifications to these embodiments once learning the basic inventive concepts thereof. Therefore, the appended claims are intended to be interpreted as including the preferred embodiments as well as all changes and modifications that fall into the scope of the present disclosure.

Obviously, those skilled in the art can make various modifications and variations to the present disclosure without departing from the spirit and scope thereof. Thus, if these modifications and variations of the present disclosure are within the scope of the claims of the application as well as their equivalents, the present disclosure is also intended to include these modifications and variations.

The invention claimed is:

1. An information processing method applied to an electronic apparatus, the method comprising:
   obtaining first track data of a motion of an operating body with respect to the electronic apparatus, and obtaining first identification data of the operating body, by obtaining a first texture of the operating body via a texture acquiring unit of the electronic apparatus, the first identification data being the first texture;
   obtaining a first movement parameter in relation to the motion of the operating body;
   deriving first input data corresponding to the first identification data and the first track data by determining a first standard texture that matches the first texture from among standard textures based on the first texture and the first movement parameter; and determining the first input data based on the first standard texture; and
   the electronic apparatus responding to the first input data.

2. The method of claim 1, wherein the obtaining first track data comprises obtaining first track data of the operating body via a touch control unit of the electronic apparatus.

3. The method of claim 2, wherein obtaining a first texture of the operating body via the texture acquiring unit of the electronic apparatus comprises detecting that a movement speed of the operating body is less than a predetermined threshold, and then acquiring the first texture via the texture acquiring unit.

4. The method of claim 1, wherein determining the first standard texture comprises:
   generating a first corrected texture based on the first movement parameter and the first texture; and
   determining a standard texture that matches the first corrected texture as the first standard texture; or
   generating analog textures based on the first movement parameter and the standard textures; and
   determining an analog texture that matches the first texture as a first analog texture, the first standard texture corresponding to the first analog texture.

5. The method of claim 1, wherein the obtaining first track data comprises:
   acquiring at least two frames of image that includes the operating body via an image acquiring unit, wherein any two frames among the at least two frames are acquired at different time; and
   determining the first track data according to a position change of the operating body from the at least two frames of image; and
   the obtaining first identification data comprises: acquiring an image of the operating body via the image acquiring unit; and
   determining the first identification data from the acquired image.

6. The method of claim 1, wherein the first input data comprises instruction data for controlling the electronic apparatus.

7. The method of claim 6, wherein the instruction data comprises an instruction to adjust a brightness of the electronic apparatus.

8. The method of claim 2, wherein obtaining the first track data comprises recording a position parameter of a contact point between the operating body and the touch control unit and a movement direction parameter of the contact point.

9. An electronic apparatus, comprising:
   a processor;
   a memory; and
   computer program instructions stored in the memory and when being run by the processor, cause the processor to:
   obtain first track data of a motion of an operating body;
   obtain first identification data of the operating body;
   obtain first input data corresponding to the first identification data and the first track data; and
   respond to the first input data, wherein the processor obtains a first texture of the operating body via a texture acquiring unit of the electronic apparatus, the first identification data being the first texture and the processor obtains a first movement parameter in relation to the motion of the operating body, and determines a first standard texture that matches the first texture from among standard textures based on the first texture and the first movement parameter and determines the first input data based on the first standard texture.

10. The electronic apparatus of claim 9, wherein the processor obtains first track data of the operating body via a touch control unit of the electronic apparatus.

11. The electronic apparatus of claim 10, wherein the processor detects that a movement speed of the operating body is less than a predetermined threshold, and then acquires the first texture via the texture acquiring unit.

12. The electronic apparatus of claim 9, wherein the processor generates a first corrected texture based on the first movement parameter and the first texture; and determines a standard texture that matches the first corrected texture as the first standard texture; or generates analog textures based on the first movement parameter and the standard textures; and determines an analog texture that matches the first texture as a first analog texture, the first standard texture corresponding to the first analog texture.

13. The electronic apparatus of claim 12, wherein the processor acquires at least two frames of image that includes the operating body via an image acquiring unit, wherein any two frames among the at least two frames are acquired at different time; determines the first track data according to a position change of the operating body from the at least two frames of image; and acquires an image of the operating body via the image acquiring unit; and determines the first identification data from the acquired image.

14. The electronic apparatus of claim 10, wherein the processor records a position parameter of a contact point between the operating body and the touch control unit, and a movement direction parameter of the contact point.

15. The electronic apparatus of claim 10, wherein the first input data comprises instruction data for controlling the electronic apparatus.

16. The electronic apparatus of claimed in claim 15, wherein the instruction data is an instruction to adjust a brightness of the electronic apparatus.

\* \* \* \* \*